(12) United States Patent
Wang et al.

(10) Patent No.: US 11,822,417 B2
(45) Date of Patent: Nov. 21, 2023

(54) FACTORY POWER MANAGEMENT AND CONTROL SYSTEM AND METHOD BASED ON EDGE-CLOUD COORDINATION

(71) Applicant: CHONGQING UNIVERSITY OF POSTS AND TELECOMMUNICATIONS, Chongqing (CN)

(72) Inventors: Ping Wang, Chongqing (CN); Xu Yang, Chongqing (CN); Min Wei, Chongqing (CN); Caiqin Li, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 403 days.

(21) Appl. No.: 17/261,875

(22) PCT Filed: Jul. 15, 2020

(86) PCT No.: PCT/CN2020/102200
§ 371 (c)(1),
(2) Date: Jan. 21, 2021

(87) PCT Pub. No.: WO2021/114661
PCT Pub. Date: Jun. 17, 2021

(65) Prior Publication Data
US 2022/0187894 A1    Jun. 16, 2022

(30) Foreign Application Priority Data

Dec. 11, 2019   (CN) .......................... 201911270941.6

(51) Int. Cl.
*G06F 1/00*        (2006.01)
*G06F 1/329*       (2019.01)
(Continued)

(52) U.S. Cl.
CPC ....... *G06F 1/329* (2013.01); *G05B 19/41885* (2013.01); *G06F 9/505* (2013.01);
(Continued)

(58) Field of Classification Search
CPC ........ G06F 1/329; G06F 9/505; G06F 9/5072; G06F 9/5088; G06F 1/28; G06F 1/3296;
(Continued)

(56) References Cited

U.S. PATENT DOCUMENTS

| 11,679,494 B2 * | 6/2023 | Skaaksrud | G06Q 10/083 |
| | | | 700/245 |
| 2012/0029720 A1 * | 2/2012 | Cherian | H02J 13/00 |
| | | | 700/297 |

(Continued)

*Primary Examiner* — Volvck Derose
(74) *Attorney, Agent, or Firm* — Michael D. Eisenberg

(57) ABSTRACT

The present invention provides a factory power management and control method based on edge-cloud coordination, including: 1) forming an industrial field network by a field node, a routing node and a device executing production tasks; 2) parsing production task information data and sending; 3) issuing an STN model in production field to an edge node; 4) sending to the edge node; 5) computing, required to complete the production tasks; 6) computing values of comprehensive ranks; 7) executing, by the edge node, the higher rank, and executing, by the cloud power management center, the lower rank; 8) executing, by the edge node, a demand response algorithm; 9) executing, by the production device, the production tasks based on computing results; and executing, by a power generation station in factory, a power storage station in factory and a power supply station outside factory, corresponding schemes based on the results.

6 Claims, 2 Drawing Sheets

(51) Int. Cl.
*G05B 19/418* (2006.01)
*G06F 9/50* (2006.01)
*G06F 1/3203* (2019.01)

(52) U.S. Cl.
CPC .......... *G06F 9/5072* (2013.01); *G06F 9/5088* (2013.01); *G06F 1/3203* (2013.01)

(58) Field of Classification Search
CPC ..... G06F 1/26; G05B 19/41885; Y02P 90/02; G06Q 10/06313; G06Q 10/06315; G06Q 50/06; G06Q 10/0633; H04L 67/10
USPC ........................................................ 713/323
See application file for complete search history.

(56) References Cited

U.S. PATENT DOCUMENTS

| | | | |
|---|---|---|---|
| 2014/0277806 A1* | 9/2014 | Keller .................. | G06F 1/3203 700/295 |
| 2019/0041960 A1* | 2/2019 | Guim Bernat ...... | H04L 41/5051 |
| 2022/0114010 A1* | 4/2022 | Guim Bernat .......... | H04L 47/83 |
| 2022/0187894 A1* | 6/2022 | Wang ........................ | G06F 1/28 |
| 2022/0197773 A1* | 6/2022 | Butler .................. | G06F 9/5038 |
| 2022/0256320 A1* | 8/2022 | Trang ...................... | H04W 4/44 |
| 2023/0156976 A1* | 5/2023 | An ...................... | H05K 7/20718 700/300 |
| 2023/0189058 A1* | 6/2023 | Yeh .................. | H04W 28/0865 370/329 |

\* cited by examiner

FACTORY POWER MANAGEMENT AND CONTROL SYSTEM AND METHOD BASED ON EDGE-CLOUD COORDINATION

TECHNICAL FIELD

The present invention belongs to the field of factory power management and control, and relates to a factory power management and control system and method based on edge-cloud coordination.

BACKGROUND

Edge computing refers to using a distributed open platform that integrates core capabilities of network, computing, storage and application to provide nearest edge intelligent services at a network edge side close to an object or data source, so as to meet key demands of industry digitization in agile connection, real-time service, data optimization, application intelligence, security and privacy protection, and other aspects. Edge computing can serve as a bridge connecting the physical and digital worlds, enabling intelligent assets, intelligent gateways, intelligent systems and smart services. Because the edge side needs to support multiple network interfaces, protocols and topologies, real-time service processing and deterministic delay, data processing and analysis, distributed intelligence and security and privacy protection, while it is difficult for the cloud to meet the above requirements, edge computing and cloud computing are required to collaborate in the aspects of network, service, application, and intelligence.

Edge-cloud coordination may magnify values of edge computing and cloud computing. Edge computing and cloud computing have respective advantages: cloud computing is good at global, non-real-time, long-term big data processing and analysis, and can make the most of the advantage in long-term maintenance, service decision support and other fields; edge computing is more suitable for processing and analysis of local, real-time, and short-term data, and can better support real-time intelligent decision-making and execution of local services.

Therefore, the relationship between edge computing and cloud computing is not a substitute relationship, but a complementary coordination relationship. Edge computing and cloud computing need to be closely coordinated to better meet the matching of various demand scenarios, thereby magnifying application values of edge computing and cloud computing. Edge computing is not only close to an execution unit, but is also a collection and preliminary processing unit of high-value data required by the cloud, which can better support cloud applications; conversely, service rules or models output by cloud computing through big data analysis and optimization may be issued to the edge side, and edge computing runs based on new service rules or models. Edge-cloud coordination involves resource coordination, data coordination, intelligence coordination, application management coordination, service management coordination, service coordination and other aspects.

In the aspect of factory power management and control, researches at home and abroad mainly focus on centralized management and control of factory power, to solve the problems of limited traditional power management and control methods and high factory power costs. Centralized management and control methods have several major limitations:

① timeliness is insufficient: the amount of power data information in factory field is huge, so moving all power data to the cloud for centralized computation may cause delay in transmission of control instructions and increase in power consumption costs.

② power supply-power consumption cannot be jointly managed and controlled: a factory electricity consumption layer and a factory power supply layer cannot achieve joint management and control, resulting in insufficient or surplus power supply, thus resulting in increase in power consumption costs.

③ security is insufficient: as a centralized computing center, factory cloud plays a role in centralized scheduling of the entire factory power management and control system, so once it faces a security threat, consequences are extremely serious.

SUMMARY

In view of this, the present invention is no longer limited to cloud computing, further studies edge computing and integrates same into factory power management and control, uses edge-cloud coordination computing to improve the flexibility, security, and timeliness of the factory power management and control system, and reduces factory power costs by simultaneously reducing power consumption costs and power supply costs; and provides a factory power management and control system and method based on edge-cloud coordination.

To achieve the above purpose, the present invention provides the following technical solution:

On the one hand, the present invention provides a factory power management and control system based on edge-cloud coordination, including a cloud power management layer, an edge computing layer, a device layer and a power supply side, wherein the cloud power management layer includes a cloud power management center and an industrial cloud server, wherein the cloud power management center is used to execute a part of computing tasks and return computing results to an edge node, and is also used to store an STN task model in production field and issue same to the edge node; and the industrial cloud server is used to store power supply and power consumption schemes generated by the edge node, to use same as a reference in scheme generation process in the future;

the edge computing layer includes a plurality of edge nodes, wherein the edge nodes are used to: ① compute an electricity demand $E_d$ required for production tasks; ② compute an electricity demand required to complete established production task according to STN task model information issued by the cloud power management center and real-time task information sent by a factory device layer; ③ receive power supply information data from the power supply side, including a real-time power price model, a power storage model and a power generation model; ④ judge algorithm complexity ranks O, judge data timeliness ranks TIME_priority, and compute comprehensive ranks R; ⑤ send a part of computing tasks to the cloud power management center according to the comprehensive ranks R, accept computing results of this part, and perform computing of a remaining part of tasks at the edge node; ⑥ comprehensively obtain a power consumption scheme $Scheme_t$ and a power supply scheme $Scheme_p$ according to the computing results; ⑦ send the power consumption scheme $Scheme_p$ to the factory device layer to execute production tasks, and send the power supply scheme to the power supply side to execute power supply tasks;

the device layer includes a field node, a routing node and production device, wherein production information about the production device is collected by an industrial field network formed by the field node, and is sent to the edge node by the routing node; the power consumption scheme from the edge node is received by the routing node, and the device layer is controlled to execute production tasks according to the scheme; the production device, that is, a device that executes a plan in industrial field, is used to execute production tasks in the power consumption scheme;

the power supply side includes a power supply proxy, a power station outside factory, a power generation station in factory and a power storage station in factory, wherein the power supply proxy is used to store a power price model of the power station outside factory, a power generation model of the power generation station in factory, and a power storage model of the power storage station in factory, and if any model is updated, send same to the edge node; the power station outside factory is used to connect a power grid of the factory, to supply power to the factory; the power generation station in factory, as a self-built power generation station of the factory, is used to supply power to the factory; the power storage station in factory is used to store power when power price is low, and supplies power to the factory when power price is high.

On the other hand, the present invention provides factory power management and control method based on edge-cloud coordination, comprising following steps:

S1: storing an STN task model $M_t$ in production field at the cloud power management center, storing a power generation model $M_g$, a power storage model $M_s$, and a power price model $M_p$ of the power supply side in the power supply proxy, and specifying algorithm complexity ranks;

S2. forming an industrial field network by a field node, a routing node and a device executing production tasks of the device layer;

S3. parsing, by the field node, production task information data Ip and sending same to the edge node;

S4: issuing, by the cloud power management center, an STN model in production field to the edge node;

S5: sending, by the power supply proxy of the power supply side, the power generation model $M_g$, the power storage model M and the power price model $M_p$ to the edge node;

S6: computing, by the edge node, an electricity demand $E_d$ required to complete these production tasks according to the production task information data $I_p$ and the STN task model $M_t$;

S7: judging, by the edge node, algorithm complexity ranks according to values of algorithm head O and Table 1;

S8: judging, by the edge node, data timeliness ranks through values of TIME_priority in data frames according to Table 2;

S9: computing, by the edge node, values of comprehensive ranks R through values of algorithm complexity ranks O and values of data timeliness ranks TIME_priority according to Table 3;

TABLE 3

Edge-cloud coordination computing

| Serial number | Computing category | Timeliness rank | Algorithm complexity | Comprehensive rank | Edge-cloud coordination |
|---|---|---|---|---|---|
| 1 | Low timeliness, extremely high complexity | 1 | 1 | 2 | Cloud computing |
| 2 | Moderate timeliness, extremely high complexity | 2 | 1 | 3 | Cloud computing |
| 3 | Low timeliness, high complexity | 1 | 2 | 3 | Cloud computing |
| 4 | Moderate timeliness, high complexity | 2 | 2 | 4 | Cloud computing |
| 5 | Low timeliness, moderate complexity | 1 | 3 | 4 | Cloud computing |
| 6 | Low timeliness, extremely high complexity | 3 | 1 | 4 | Cloud computing |
| 7 | Low timeliness, low complexity | 1 | 4 | 5 | Edge computing |
| 8 | Low timeliness, extremely high complexity | 4 | 1 | 5 | Edge computing |
| 9 | Moderate timeliness, moderate complexity | 2 | 3 | 5 | Edge computing |
| 10 | Low timeliness, high complexity | 3 | 2 | 5 | Edge computing |
| 11 | Moderate timeliness, low complexity | 2 | 4 | 6 | Edge computing |
| 12 | Extremely high timeliness, high complexity | 4 | 2 | 6 | Edge computing |
| 13 | Low timeliness, moderate complexity | 3 | 3 | 6 | Edge computing |

TABLE 3-continued

Edge-cloud coordination computing

| Serial number | Computing category | Timeliness rank | Algorithm complexity | Comprehensive rank | Edge-cloud coordination |
|---|---|---|---|---|---|
| 14 | High timeliness, low complexity | 3 | 4 | 7 | Edge computing |
| 15 | Extremely high timeliness, moderate complexity | 4 | 3 | 7 | Edge computing |
| 16 | Extremely high timeliness, low complexity | 4 | 4 | 8 | Edge computing |

S10: storing, by the edge node, computations of which the values or comprehensive ranks R are 5, 6, 7, 8 locally;

S11: sending, by the edge node, computations of which the values of comprehensive ranks R are 2, 3, 4 to the cloud power management center, S12: executing, by the edge node, the computations of which the values of comprehensive ranks R are 5, 6, 7, 8, and saving computing results locally; executing, by the cloud power management center, the computations of which the values of comprehensive ranks are 2, 3, 4 sent by the edge node;

S13: returning, by the cloud power management center, the computing results to the edge node;

S14: executing, by the edge node, a demand response algorithm;

S15: sending, by the edge node, the power consumption scheme $Scheme_i$ to the field node, and sending the power supply scheme $Scheme_p$ to the power supply proxy;

S16: sending, by the field node, the $Scheme_i$ to the production device to execute production tasks; controlling, by the power supply proxy, the power generation station in factory, the power storage station in factory and the power supply station outside factory to execute corresponding schemes;

Step 17: storing, by the edge node, the schemes in the cloud power management center simultaneously to be used as a reference for future operation schemes.

Further, step S1 specifically comprises:

(1) Storing, by a factory power system manager, the STN task model $M_t$ in production field in the cloud power management center in advance, $M_t=\{Task\ number-i, Electricity_i=E_i\}$, where $E_i$ represents electricity consumption required to run a task I in unit time.

(2) Storing the power generation model $M_g$, the power storage model $M_s$, and the power price model $M_p$ of the power supply side in the power supply proxy in advance.

(3) Computing algorithm complexities: testing, by the factory power system manager, all algorithms that need to be executed on a computer on the edge node, analyzing algorithm complexity attributes as {extremely high complexity, high complexity, moderate complexity, low complexity} in the case of comprehensive consideration of space complexity and time complexity; grading the algorithms according to the algorithm complexity attributes, denoted by O; algorithm complexity ranks corresponding to Table 1, $O \in [1-4]$, and marking values of O at algorithm heads.

The algorithm complexities are divided into 4 ranks and the algorithm complexities progressively decrease in order, rank 1 indicates that the algorithm complexity is extremely high, and rank 4 indicates that the algorithm complexity is low. For different algorithm complexities, computation time thereof are different, and storage spaces occupied when computation is executed are different. Complexity attributes corresponding to complexity ranks are shown in Table 1.

TABLE 1

Algorithm complexity rank

| Algorithm complexity rank | Algorithm complexity attribute |
|---|---|
| O = 1 | Extremely high complexity |
| O = 2 | High complexity |
| O = 3 | Moderate complexity |
| O = 4 | Low complexity |

Further, step S2 specifically comprises: collecting from the production device, by the field node, data frame information tables {Task_number, $T_i$, protocol, ID, data_source, Task_type} respectively representing task number, task execution time, industrial protocol, network ID, data source address, and task type; marking, by the field node, data frames with different timeliness ranks according to the task type Task_type in the data frame information tables in an MAC layer, so the marked frame information tables become {Task_number, $T_i$, protocol, ID, data_source, Task_type, TIME_priority}, where TIME_priority$\in$[1-4]; TIME_priority represents data timeliness ranks, and data attributes represented by values thereby are shown in Table 2. Values of TIME_priority correspond to 4 timeliness ranks, rank 1 to rank 4 in sequence, priority ranks progressively increase in order, 1 indicates that the requirement for timeliness is not high, 4 indicates that the requirement for timeliness is extremely high. Timeliness attributes corresponding to timeliness ranks are shown in Table 2.

TABLE 2

Data Timeliness Ranks

| Timeliness rank | Timeliness attribute |
|---|---|
| TIME_priority = 1 | Low |
| TIME_priority = 2 | Moderate |
| TIME_priority = 3 | High |
| TIME_priority = 4 | Extremely high |

Further, in step S3, $I_p$ may be parsed from the frame information tables, $I_p=\{Task\_number-i, i \in N^*, T_i, T_i \in R+\}$, where i represents task number, and $T_i$ represents task execution time.

Further, in step S14, inputs of the demand response algorithm are the electricity demand $E_d$, the power generation model $M_g$, the power storage model $M_s$, and the power price model $M_p$; and outputs are the power consumption scheme $Scheme_i$, and the power supply scheme $Scheme_p$;

1) in combination with the production task information data $I_p$ and the STN task model $M_t$, the electricity demand $E_d$ is computed:

$$E_d = \sum_i T_i E_i;$$

2) the power generation model is $M_s=\{E_s,E_{sp},S_s,T_s,P_s\}$, where $P_g$ represents power generation cost in unit time of one generator, $x_g$ represents number of generators that need to run in the factory, $E_g$ represents power supply amount in unit time of the power generation station in factory, and $T_g$ represents power generation time of each generator;

3) the power storage model is $M_s=\{E_s, E_{sp}, S_s, T_s, P_s\}$, where it is assumed that charging power of a power storage machine is $E_s$, discharging power $E_{sp}$ is the current device power, and charging is performed only when the power supply station outside the factory supplies power, $S_s$ represents state of the power storage machine, $S_s=0$ represents that the power storage machine is in a discharging state, $S_s=1$ represents that the power storage machine is in a charging state, $T_s$ represents time the power storage machine is in the charging/discharging state, and $P_s$ represents power price when the power storage machine is charged;

4) the power price model is $M_p-\{P, E_p\}$, where P represents price of power supplied to the factory, and $E_p$ represents power supply amount per unit time of the power station outside the factory;

5) after computing all results, the edge node generates a power consumption scheme $Scheme_i$, $Scheme_i=\{Task\_number=i, i \in N^*; T\_exe; Period; T_{\_exe}, Period \in R+\}$, where Task_number represents task number, T_exe represents task execution time, and Period represents task execution duration;

6) after computing all results, the edge node generates a power supply scheme $Scheme_p$, $Scheme_p=\{x_g, T_g, S_s, T_s, P, S_p, T_p\_01, T_p\_10\}$, where $x_g$ represents number of generators that need to run in the power station in factory;

$T_g$ represents power generation time of each generator;

$S_s$ represents a state of the power storage machine, $S_s=0$ represents that the power storage machine is in a discharging state, $S_s=1$ represents that the power storage machine is in a charging state;

$T_s$ represents time the power storage machine is in the charging/discharging state;

P represents current power price;

$S_p$ represents a power supply state of the power station outside factory, $S_p=00$ represents that the power station is in a sleep state, $S_p=01$ represents that the power station only supplies power to the production device, $S_p=10$ represents that the power station only supplies power to the power storage station, and $S_p=11$ represents that the power station supplies power to both the device layer and the power storage station;

$T_p\_S_p$ represents power supply time in the $S_p$ state, $T_p\_01$ represents time to supply power to the production device only, and $T_p\_10$ represents time to supply power to the power storage station only;

7) computing according to following formulae $$E_d = E_{sp}*T_s + T_p\_01*E_p + E_g*T_g$$

$$C = T_p10*P_s + T_p01*P + x_g*P_g*T_g$$

in the case where an electricity demand $E_d$ of a power consumption side is satisfied, if it is computed that the above two formulae are satisfied, a parameter combination with small C is selected as a final scheme;

8) generating schemes: after the above computation, a power consumption scheme $Scheme_i$ and a power supply scheme $Scheme_p$ are generated.

The present invention has the following beneficial effects:

Edge-cloud coordination computing improves timeliness: in this solution, the edge nodes locally process the production task data from the device layer, and form a real-time feedback control loop with a field device, so the management and control efficiency is effectively improved, the instruction transmission time is shortened, and power supply and power consumption schemes are generated in real time, and are provided to the production device and various power stations of the power supply side for execution. According to the method, the power data of a power plant and the generated schemes can be stored in the cloud, and then the subsequent scheme generation time can be shortened. According to the method, by using the advantages of edge computing and cloud computing, algorithm complexities and data timeliness are ranked, and comprehensive ranks are obtained. Computations of which the comprehensive ranks are 2, 3, 4 are uploaded to the cloud for execution, and computations of which the comprehensive ranks are 5, 6, 7, 8 are placed at the edge for localization execution. On the premise of increasing the timeliness of the entire power management and control system, schemes are updated in real time, and scheme generation time and instruction transmission time are shortened, thereby reducing power consumption costs. Compared with a centralized scheduling mechanism, timeliness may greatly improve the performance of the power management and control system.

Joint scheduling of power supply-power consumption increases flexibility: in this solution, a power consumption side and a power supply side are jointly scheduled, so not only "peak-load shifting" is achieved, that is, when the power price is low, not only high-power device is turned on at the device layer, but also a charging function of the power storage system is enabled at the power supply side. When the power price is high, a low-power device is turned on at the device layer, and a discharging function of the power storage system is enabled systematically at the power supply side. The cost reduction of the power consumption side is mainly achieved by adding production tasks when the power price is low, and the cost reduction of the power supply side is achieved by charging the power storage station when the power price is low, and discharging the power storage station when the power price is high. Compared with the centralized scheduling mechanism, simultaneous scheduling of power supply and power consumption can significantly improve the performance of the power management and control system.

Edge-cloud coordination distributed computing improves security: in this solution, the main computing tasks are completed by the edge nodes, since the edge nodes are distributed dispersedly, even if the security of several edge nodes is threatened, the tasks are then executed by other edge nodes, having little impact on the entire power management and control system. Compared with centralized scheduling, in case of breakdown of a centralized scheduling center, the entire production system may suffer from a fatal blow. Therefore, the edge-cloud coordination technology can improve the security of the power management and control system.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF DRAWINGS

To enable the purpose, the technical solution and the advantages of the present invention to be more clear, the present invention will be preferably described in detail below in combination with the drawings, wherein.

DETAILED DESCRIPTION

Figure 1:
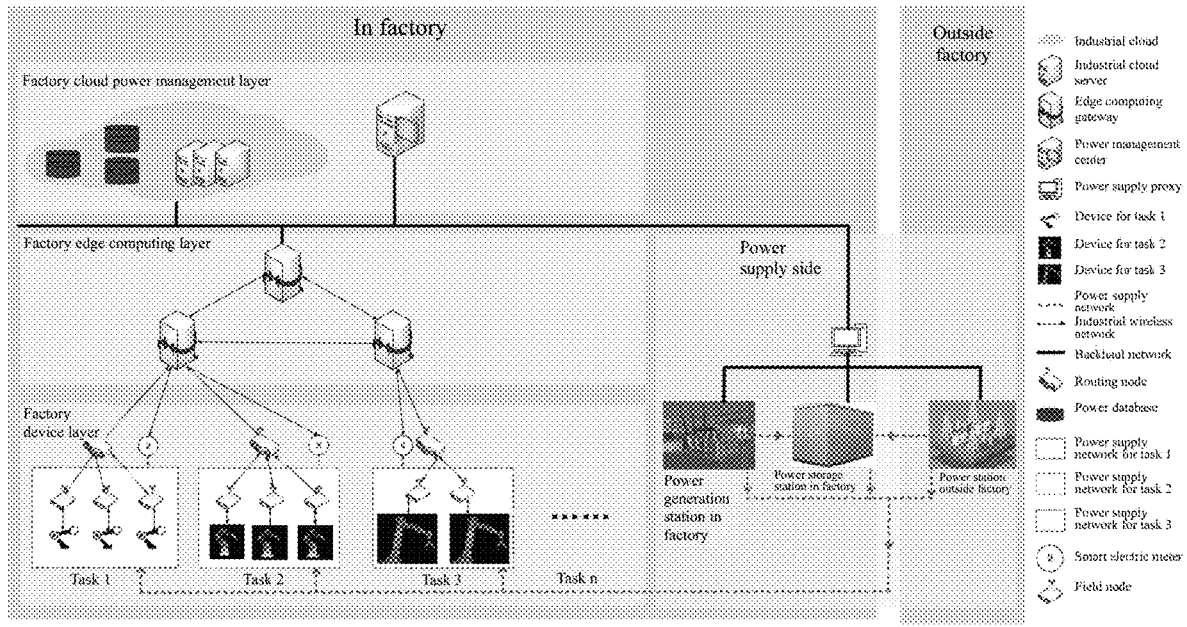
FIG. 1 is a structural schematic diagram of the factory power management and control system based on edge-cloud coordination of the present invention.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference signs in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

On the one hand, the present invention provides a factory power management and control system based on edge-cloud coordination, as shown in FIG. 1, including a cloud power management layer, an edge computing layer, a device layer and a power supply side, wherein the cloud power management layer includes a cloud power management center and an industrial cloud server, wherein the cloud power management center is used to execute a part of computing tasks and return computing results to an edge node, and is also used to store an STN task model in production field and issue same to the edge node; and the industrial cloud server is used to store power supply and power consumption schemes generated by the edge node, to use same as a reference in scheme generation process in the future;

The edge computing layer includes a plurality of edge nodes, wherein the edge nodes are used to: ① compute an electricity demand $E_d$ required for production task; ② compute an electricity demand required to complete established production tasks according to the STN task model information issued by the cloud power management center and real-time task information sent by a factory device layer; ③ receive power supply information data from the power supply side, including a real-time power price model, a power storage model and a power generation model; ④ judge algorithm complexity ranks O, judge data timeliness ranks TIME_priority, and compute comprehensive ranks R; ⑤ send a part of computing tasks to the cloud power management center according to the comprehensive ranks R, accept computing results of this part, and perform computing of a remaining part of tasks at the edge node; ⑥ comprehensively obtain a power consumption scheme $Scheme_i$ and a power supply scheme $Scheme_p$ according to computing results; ⑦ send the power consumption scheme $Scheme_p$ to the factory device layer to execute production tasks, and send the power supply scheme to the power supply side to execute power supply tasks;

the device layer includes a field node, a routing node and production device, wherein production information about the production device is collected by an industrial field network formed by the field node, and is sent to the edge node by the routing node; the power consumption scheme from the edge node is received by the routing node, and the device layer is controlled to execute production tasks according to the scheme; the production device, that is, a device that executes a plan in industrial field, is used to execute production tasks in the power consumption scheme;

the power supply side includes a power supply proxy, a power station outside factory, a power generation station in factory and a power storage station in factory, wherein the power supply proxy is used to store a power price model of the power station outside factory, a power generation model of the power generation station in factory, and a power storage model of the power storage station in factory, and if any model is updated, send same to the edge node; the power station outside factory is used to connect a power grid of the factory, and supply power to the factory; the power generation station in factory, as a self-built power generation station of the factory, is used to supply power to the factory; the power storage station in factory is used to store power when power price is low, and supplies power to the factory when power price is high.

Figure 2:
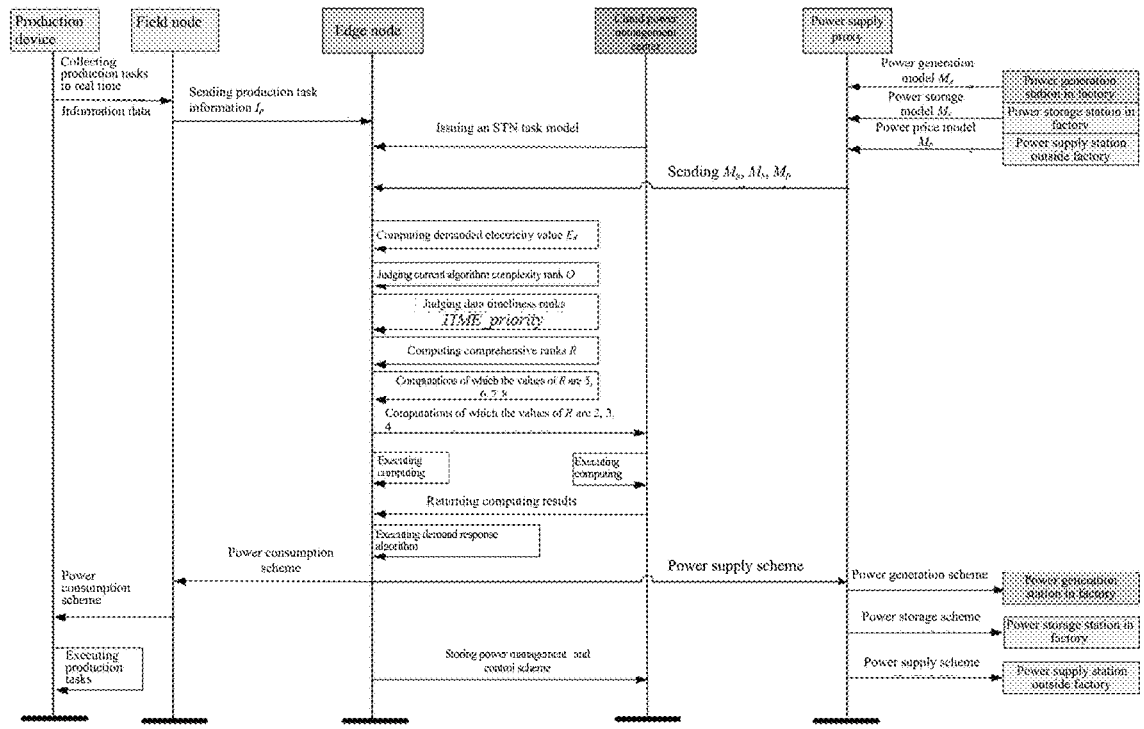
FIG. 2 is a flow chart of the factory power management and control method based on edge-cloud coordination of the present invention.

On the other hand, as shown in FIG. 2, the present invention provides a factory power management and control method based on edge-cloud coordination. The design of the factory power management and control method based on edge-cloud coordination will be described in detail below in combination with examples. Aiming at the situation where there is a need to quickly generate a power supply scheme and a power consumption scheme at an edge node in an industrial field, the present invention provides specific embodiments of the patent.

Preparations are made first:

(1) storing, by a factory power system manager, the STN task model $M_t$ in production field in the cloud power management center in advance, $M_t=\{Task\_number=i, Electricity_i=E_i\}$, where i represents task number, and electricity consumption per hour may be computed in KWH, so the electricity consumption of each task can be directly expressed by power. Four tasks Task_number=$\{1, 2, 3, 4\}$ are required to be completed in the production flow, where task 4 is required to run all the while. Let $E_1=5$ KW, $E_2=10$ KW, $E_3=30$ KW, $E_4=50$ KW.

(2) Storing the power generation model=$\{P_g=1.0$ Yuan/KWH, $x_g, E_g, T_g\}$ of the power supply side; the power storage model $M_s=\{E_s=6.25$ KW, $E_{sp}, S_s, T_s, P_s\}$, with the charging power is 6.25 KW, and the maximum capacity of the power storage station is 50 KWH, that is, the power storage station can be fully charged in 8 h; and the power price model $M_p$ (as shown in Table 4), with the discharging probability $E_{sp}$ is the power of the current power consumption device, in the power supply proxy in advance.

TABLE 4

Power price model

| Time period | Power price (Yuan/KWH) |
| --- | --- |
| 8:00-11:30<br>18:30-23:00 | $P_{peak} = 1.5$ |
| 7:00-8:00<br>11:30-18:30 | $P_{flat} = 0.8$ |
| 23:00-7:00 | $P_{valley} = 0.5$ |

(3) Computing algorithm complexities: testing, by the factory power system manager, all algorithms that need to be executed on a computer on the edge node, and marking values of the algorithm complexity O at algorithm heads.

Step 1: collecting from the production device, by the field node, data frame information tables $\{Task\_number, T_i, protocol, ID, data\_source, Task\_type, TIME\_priority\}$ respectively representing task number, task execution time, industrial protocol, network ID, data source address, task type, and timeliness rank. After the field node parses collected data frames, following task information may be obtained.

TABLE 5

Task model

| Task_number | $T_i$ | protocol | ID | data_source | Task_type | TIME_priority |
| --- | --- | --- | --- | --- | --- | --- |
| 1 | 1 h | WIA-PA | R1 | Manipulator arm 1 | Ingredient mixing | 1 |
| 2 | 2 h | WIA-PA | R2 | Manipulator arm 2 | Grasp | 2 |
| 3 | 3 h | WIA-PA | R3 | Manipulator arm 3 | Assembly | 3 |
| 4 | 4 h | WIA-PA | R4 | Manipulator arm 4 | Plastic package | 4 |

Step 2, parsing, by the field node, production task information data $I_p$ and sending same to the edge node. $I_p$ may be parsed from the frame information tables, $I_p=\{(Task\_numnber=1, T_i=1); (Task\_number=2, T_i=2); (Task\_number=3, T_i=3); (Task\_number=4, T_i=4)\}$, where i represents task number, and $T_i$ represents task execution time. Four tasks Task_number=$\{1, 2, 3, 4\}$ are required to be completed in the production flow, where task 4 is required to run all the while.

Step 3: issuing, by the cloud power management center, an STN model $M_t=\{(1.5$ KW$); (2.10$ KW$); (3.30$ KW$); (1.50$ KW$);\}$ in production field to the edge node.

Step 4: sending, by the power supply proxy of the power supply side, the power generation model $M_g$, the power storage model $M_s$ and the power price model $M_p$ to the edge node.

Step 5: computing, by the edge node, an electricity demand $E_d$ required to complete these production tasks according to the production task information data $I_p$ and the STN task model $M_t$.

$$E_d=1*5 \text{ KW}+2*10 \text{ KW}+3*30 \text{ KW}+4*50 \text{ KW}=315 \text{ KWH}$$

Step 6: searching, by the edge node, an algorithm head to obtain values of O.

Step 7: judging, by the edge node, data timeliness ranks through values of TIME_priority in data frames according to Table 1 to obtain TIME_priority(1)=1; TIME_priority(2)=2; TIME_priority(3)=3; TIME_priority(4)=4.

Step 8: computing, by the edge node, values of comprehensive ranks R through values of algorithm complexity ranks O and values of the data timeliness ranks TIME_priority according to Table 3.

Step 9: storing, by the edge node, computations of which the values of comprehensive ranks R are 5, 6, 7, 8 locally.

Step S10: sending, by the edge node, computations of which the values of comprehensive ranks R are 2, 3, 4 to the cloud power management center.

Step S11: executing, by the edge node, the computations of which the values of comprehensive ranks R are 5, 6, 7, 8, and saving computing results locally; executing, by the cloud power management center, the computations of which the values of comprehensive ranks are 2, 3, 4 sent by the edge node.

Step 12: returning, by the cloud power management center, the computing results to the edge node.

Step 13: executing, by the edge node, a demand response algorithm.

Figure 3:
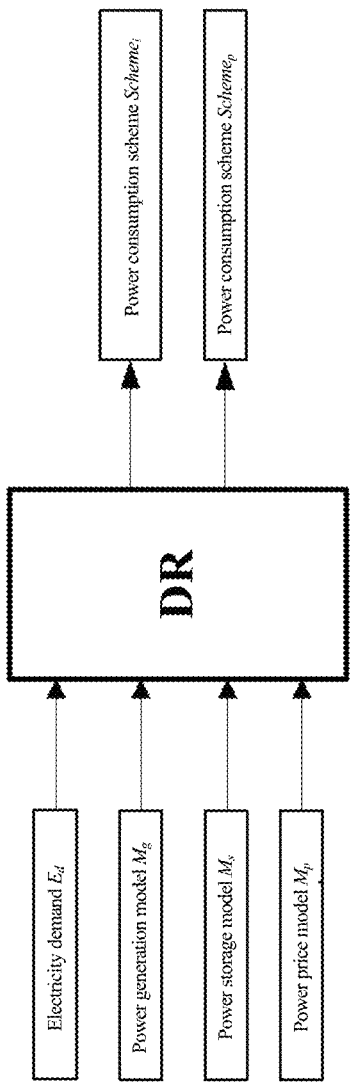
FIG. 3 is a flow diagram of the demand response algorithm of the present invention.

As shown in FIG. 3, inputs of the demand response (DR) algorithm are the electricity demand $E_d$, the power generation model $M_g$, the power storage model $M_s$, and the power price model $M_p$; and outputs are the power consumption scheme $Scheme_i$, and the power supply scheme $Scheme_i$.

(1) Electricity Demand $E_d$

In combination with the production task information data $I_p$ and the STN task model $M_t$, the electricity demand $E_d$ may be computed. 1, may be parsed from the frame information tables, $I_p$={Task_number=i, i∈N*, $T_i$, $T_i$∈R+}, where i represents task number, and $T_i$ represents task execution time; $M_t$={Task_number=i, Electricity$_i$=$E_i$}, where $E_i$ represents electricity consumption required to run a task i in unit time.

Electricity demand $$E_d = \sum_i T_i E_i.$$

(2) Power Generation Model $M_g$

Here, it is assumed that the power generation system is powered by diesel oil and natural gas, the power generation model is computed from the price of power generation materials consumed by the generator per unit time, and it is assumed that the cost of power generation per unit time of one generator is $P_g$. It is assumed that the number of generators that need to run in the factory is $x_g$. In this part, the costs of starting and shutting down an engine are ignored. $E_g$ represents the power supply amount per unit time of the power generation station in the factory, and $T_g$ represents the power generation time of each generator. Therefore, the power generation model is $$Mg=\{Pg, xg, Eg, Tg\}$$

(3) Power Storage Model $M_s$

It is assumed that the charging power of one power storage machine is $E_s$, the discharging power $E_{sp}$ is the current device power, and charging is performed only when the power supply station outside factory supplies power. $S_s$ represents a state of the power storage machine, $S_s$=0 represents that the power storage machine is in a discharging state, $S_s$=1 represents that the power storage machine is in a charging state. $T_s$ represents time the power storage machine is in the charging/discharging state, and $P_s$ represents power price when the power storage machine is charged. Therefore, the power storage model is $$Ms=\{Es, Esp, Ss, Ts, Ps\}$$

(4) Power Price Model $M_p$

The power price model depends on the situation of an external power supply unit, including a Day-ahead power price model, a real-time power price model and a segmented power price model in general. P represents the price of power supplied to the factory. $E_p$ represents power supply amount per unit time of the power station outside factory. Therefore, the power price model is $$M_p=\{P, E_p\}$$

(5) Power Consumption Scheme Schemer

After computing all results, the edge node may generate $Scheme_i$. $Scheme_i$={Task_number=i, i∈N*; T_exe; Period; $T_{exe}$, Period∈R+}, where Task_number represents task number, T_exe represents task execution time, and Period represents task execution duration.

(6) Power supply scheme $Scheme_p$

After computing all results, the edge node may generate $Scheme_p$. $Scheme_p$={$x_g$, $T_g$, $S_s$, $T_s$, P, $S_p$, $T_p\_01$, $T_p\_10$}.

$x_g$ represents number of generators that need to run in the power station in factory;

$T_g$ represents power generation time of each generator;

$S_s$ represents a state of the power storage machine, $S_s$=0 represents that the power storage machine is in a discharging state, $S_s$=1 represents that the power storage machine is in a charging state;

$T_s$ represents time the power storage machine is in the charging/discharging state;

P represents current power price;

$S_p$ represents a power supply state of the power station outside factory, $S_p$=00 represents that the power station is in a sleep state, $S_p$=01 represents that the power station only supplies power to the production device, $S_p$=10 represents that the power station only supplies power to the power storage station, and $S_p$=11 represents that the power station supplies power to both the device layer and the power storage station. $T_p\_S_p$ represents the power supply time in the $S_p$ state, $T_p\_01$ represents the time to supply power to the production device only, and $T_p\_10$ represents the time to supply power to the power storage station only.

(7) Computing According to Following Formulae:

$$E_d = E_{sp}*T_s + T_p\_01*E_p + E_g*T_g$$

$$C = T_p10*P_s + T_p01*P + x_g*P_g*T_g$$

in the case where an electricity demand $E_d$ of the power consumption side is satisfied, it is computed that when the above two formulae are satisfied, a parameter combination with small C is selected as a final scheme.

(8) Generating Schemes:

after the above computation, a power consumption scheme $Scheme_i$ and a power supply scheme $Scheme_p$ are generated.

In this embodiment:

1) electricity demand $E_d$=315 KWH
2) power generation model $M_g$={$P_g$=1.0 Yuan/KWH, $x_g$, $E_g$, $T_i$}
3) power storage model $M_s$={$E_s$=6.25 KW, $E_{sp}$, $S_s$, $T_s$, $P_s$}
4) Power price model $M_p$={P, $E_p$}

According to formulae $$E_d = E_{sp}*T_s + T_p\_01*E_p + E_g*T_g$$

$$C = T_p\_10*P_s + T_p\_01*P + x_g*P_gT_g$$

in the case where an electricity demand of the power consumption side is satisfied, it is computed that when the above two formulae are satisfied, a parameter combination with small C is selected as a final scheme.

(5) Generating Schemes:

after the above computation, a power consumption scheme Schemes and a power supply scheme $Scheme_p$ are generated. There are multiple specific schemes, one of which is listed in Table 6. The scheme is a task execution scheme or a power supply scheme to complete 6 production processes within 24 hours a day. The 6 production processes refer that task 1 is executed for 6 h, task 2 is executed for 12 h, task 3 is executed for 18 h, and task 4 is executed for 24 h without interruption.

TABLE 6

Power consumption scheme and power supply scheme

| | | | 7:00-8:00 | | 8:00-11:30 | | 11:30-18:30 | | 18:30-23:00 | | 23:00-7:00 | |
|---|---|---|---|---|---|---|---|---|---|---|---|---|
| | | Task_number | T_exe | Period | T_exe | Period | T_exe | Period | T_exe | Period | T_exe | Period |
| Power consumption scheme | | 1 | Sleep | 0 H | Sleep | 0 H | Sleep | 0 H | Sleep | 0 H | 23:00 | 6 H |
| | | 2 | Sleep | 0 H | Sleep | 0 H | 11:30 | 4 H | Sleep | 0 H | 23:00 | 8 H |
| | | 3 | Operation | 1 H | Operation | 0 H | 11:30 | 7 H | 21:00 | 2 H | 23:00 | 8 H |
| | | 4 | Operation | 1 H | Operation | 3.5 H | Operation | 7 H | Operation | 4.5 H | Operation | 8 H |
| Power supply scheme | Power generation station | $x_g$ $T_g$ | 0 0 | | 5 3.5 H | | 0 0 | | 5 4.5 H | | 0 0 | |
| | Power storage station | $S_s$ $T_s$ | 1 (charging) 1 H | | 0 (discharging) 1 H[1] | | 1 (charging) 7 H | | 0 (discharging) 1 H[1] | | 1 (charging) 8 H | |
| | Power station outside factory | P $S_p$ $T_p\_01$ $T_p\_10$ | $P_{flat}=0.8$ Yuan/KWH 11 1 H 1 H | | $P_{peak}=1.5$ Yuan/KWH 01 2.5 H 0 H | | $P_{flat}=0.8$ Yuan/KWH 11 7 H 7 H | | $P_{peak}=1.5$ Yuan/KWH 01 3.5 H 0 H | | $P_{valley}=0.5$ Yuan/KWH 11 8 H 8 H | |

Note 1:
When and only when the power storage station is fully charged, it can supply power for task 4 for 1 h.

Step 14: sending, by the edge node, the power consumption scheme $Scheme_i$ to the field node, and sending, by the edge node, the power supply scheme $Scheme_p$ to the power supply proxy.

Step 15: further sending, by the field node, Scheme; to the production device to execute production tasks; controlling, by the power supply proxy, the power generation station in factory, the power storage station in factory, and the power supply station outside factory to execute corresponding schemes.

Step 16, storing, by the edge node, the schemes in the cloud power management center simultaneously to be used as a reference for future operation schemes.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

What is claimed is:

1. A factory power management and control system based on edge-cloud coordination, comprising a cloud power management layer, an edge computing layer, a device layer and a power supply side,
wherein the cloud power management layer includes a cloud power management center and an industrial cloud server, wherein the cloud power management center is used to execute a part of computing tasks and return computing results to an edge node, and is also used to store an STN task model in production field and issue same to the edge node; and the industrial cloud server is used to store power supply and power consumption schemes generated by the edge node, to use same as a reference in scheme generation process in the future;
the edge computing layer includes a plurality of edge nodes, wherein the edge nodes are used to: ① compute an electricity demand $E_d$ required for production tasks; ② compute an electricity demand required to complete established production tasks according to STN task model information issued by the cloud power management center and real-time task information sent by a factory device layer; ③ receive power supply information data from the power supply side, including a real-time power price model, a power storage model and a power generation model; ④ judge algorithm complexity ranks O, judge data timeliness ranks TIME_priority, and compute comprehensive ranks R; ⑤ send a part of computing tasks to the cloud power management center according to the comprehensive ranks R, accept computing results of this part, and perform computing of a remaining part of tasks at the edge node; ⑥ comprehensively obtain a power consumption scheme $Scheme_i$ and a power supply scheme $Scheme_p$ according to computing results; ⑦ send the power consumption scheme $Scheme_p$ to the factory device layer to execute production tasks, and send the power supply scheme to the power supply side to execute power supply tasks;
the device layer includes a field node, a routing node and a production device, wherein production information about the production device is collected by an industrial field network formed by the field node, and is sent to the edge node by the routing node; the power consumption scheme from the edge node is received by the routing node, and the device layer is controlled to execute production tasks according to the scheme; the production device, that is, a device that executes a plan in industrial field, is used to execute production tasks in the power consumption scheme;
the power supply side includes a power supply proxy, a power station outside factory, a power generation station in factory and a power storage station in factory, wherein the power supply proxy is used to store a power price model of the power station outside factory, a power generation model of the power generation station in factory, and a power storage model of the power storage station in factory, and if any model is updated, send same to the edge node; the power station outside factory is used to connect a power grid of the factory, to supply power to the factory; the power generation station in factory, as a self-built power generation station of the factory, is used to supply power to the factory; the power storage station in factory is used to store power when power price is low, and supply power to the factory when power price is high.

2. A factory power management and control method based on edge-cloud coordination, comprising following steps:

S1: storing an STN task model $M_t$ in production field in the cloud power management center, storing a power generation model $M_g$, a power storage model $M_s$, and a power price model $M_p$ of the power supply side in the power supply proxy, and specifying algorithm complexity ranks;

S2: forming an industrial field network by a field node, a routing node and a device executing production tasks of the device layer;

S3: parsing, by the field node, production task information data $I_p$ and sending same to an edge node;

S4: issuing, by the cloud power management center, an STN model in production field to the edge node;

S5: sending, by the power supply proxy of the power supply side, the power generation model M b, the power storage model $M_s$ and the power price model $M_p$ to the edge node;

S6: computing, by the edge node, an electricity demand $E_d$ required to complete these production tasks according to the production task information data $I_p$ and the STN task model $M_t$;

S7: judging, by the edge node, algorithm complexity ranks according to values of algorithm head O;

S8: judging, by the edge node, data timeliness ranks through attribute values of data frames;

S9: computing, by the edge node, values of comprehensive ranks R according to values of algorithm complexity ranks O and values of the data timeliness ranks TIME_priority;

| Serial number | Computing category | Timeliness rank | Algorithm complexity | Comprehensive rank | Edge-cloud coordination |
|---|---|---|---|---|---|
| 1 | Low timeliness, extremely high complexity | 1 | 1 | 2 | Cloud computing |
| 2 | Moderate timeliness, extremely high complexity | 2 | 1 | 3 | Cloud computing |
| 3 | Low timeliness, high complexity | 1 | 2 | 3 | Cloud computing |
| 4 | Moderate timeliness, high complexity | 2 | 2 | 4 | Cloud computing |
| 5 | Low timeliness, moderate complexity | 1 | 3 | 4 | Cloud computing |
| 6 | Low timeliness, extremely high complexity | 3 | 1 | 4 | Cloud computing |
| 7 | Low timeliness, low complexity | 1 | 4 | 5 | Edge computing |
| 8 | Low timeliness, extremely high complexity | 4 | 1 | 5 | Edge computing |
| 9 | Moderate timeliness, moderate complexity | 2 | 3 | 5 | Edge computing |
| 10 | Low timeliness, high complexity | 3 | 2 | 5 | Edge computing |
| 11 | Moderate timeliness, low complexity | 2 | 4 | 6 | Edge computing |
| 12 | Extremely high timeliness, high complexity | 4 | 2 | 6 | Edge computing |
| 13 | Low timeliness, moderate complexity | 3 | 3 | 6 | Edge computing |
| 14 | High timeliness, low complexity | 3 | 4 | 7 | Edge computing |
| 15 | Extremely high timeliness, moderate complexity | 4 | 3 | 7 | Edge computing |
| 16 | Extremely high timeliness, low complexity | 4 | 4 | 8 | Edge computing |

S10: storing, by the edge node, computations of which values of comprehensive ranks R are 5, 6, 7, 8 locally;

S11: sending, by the edge node, computations of which the values of comprehensive ranks R are 2, 3, 4 to the cloud power management center;

S12: executing, by the edge node, the computations of which the values of comprehensive ranks R are 5, 6, 7, 8, and saving computing results locally; executing, by the cloud power management center, the computations of which the values of comprehensive ranks are 2, 3, 4 sent by the edge node;

S13: returning, by the cloud power management center, the computing results to the edge node;

S14: executing, by the edge node, a demand response algorithm;

S15: sending, by the edge node, a power consumption scheme $Scheme_t$ to the field node, and sending a power supply scheme $Scheme_p$ to the power supply proxy;

S16: sending, by the field node, the Scheme$_i$ to the production device to execute production tasks; controlling, by the power supply proxy, the power generation station in factory, the power storage station in factory, and the power supply station outside factory to execute corresponding schemes;

Step 17, storing, by the edge node, the schemes in the cloud power management center simultaneously to be used as a reference for future operation schemes.

3. The factory power management and control method based on edge-cloud coordination according to claim 2, characterized in that step S1 specifically comprises:

storing the STN task model M$_g$ in production field in the cloud power management center, M$_t$={Task_number=i, Electricity$_i$=E$_i$}, where E$_i$ represents electricity consumption required to run a task i in unit time;

storing the power generation model M$_g$, the power storage model M$_s$ and the power price model M$_p$ of the power supply side in the power supply proxy;

computing algorithm complexities: testing all algorithms that need to be executed on a computer on the edge node, analyzing algorithm complexity attributes as (extremely high complexity, high complexity, moderate complexity, low complexity) in the case of comprehensive consideration of space complexity and time complexity, grading the algorithms according to the algorithm complexity attributes, denoted by O, algorithm complexity ranks corresponding to Table 1, O∈[1-4], and marking values of O at algorithm heads, wherein the algorithm complexities are divided into 4 ranks and the algorithm complexities progressively decrease in order, rank 1 indicates that the algorithm complexity is extremely high, and rank 4 indicates that the algorithm complexity is low.

4. The factory power management and control method based on edge-cloud coordination according to claim 3, characterized in that step S2 specifically comprises: collecting from the production device, by the field node, data frame information tables {Task_number, T$_i$, protocol, ID, data_source, Task_type} respectively representing task number, task execution time, industrial protocol, network ID, data source address, and task type;

marking, by the field node, data frames with different timeliness ranks according to the task type Task_type in the data frame information tables in an MAC layer, so the marked frame information tables become {Task_number, T$_i$, protocol, ID, data_source, Task_type, TIME_priority}, where TIME_priority∈[1-4];

TIME_priority represents data timeliness ranks, and values thereof correspond to 4 timeliness ranks, rank 1 to rank 4 in sequence, priority ranks progressively increase in order, 1 indicates that the requirement for timeliness is not high, 4 indicates that the requirement for timeliness is extremely high.

5. The factory power management and control method based on edge-cloud coordination according to claim 4, characterized in that in step S3, I$_p$ is parsed from the frame information tables, I$_p$={Task_number=i, i∈N*, T$_i$, T$_i$∈R+}, where i represents task number, and T$_i$ represents task execution time.

6. The factory power management and control method based on edge-cloud coordination according to claim 5, characterized in that in step S14, inputs of the demand response algorithm are the electricity demand E$_d$, the power generation model M$_g$, the power storage model M$_s$, and the power price model M$_p$; and outputs are the power consumption scheme Scheme$_i$, and the power supply scheme Scheme$_p$;

a) in combination with the production task information data I$_p$ and the STN task model M$_t$, the electricity demand E$_d$ is computed:

$$E_d = \sum_i T_i E_i;$$

b) the power generation model is M$_g$={P$_g$, x$_g$, E$_g$, T$_g$}, where P$_g$ represents power generation cost in unit time of one generator, x$_g$ represents number of generators that need to run in the factory, E$_g$ represents power supply amount in unit time of the power generation station in factory, and T$_g$ represents power generation time of each generator;

c) the power storage model is M$_s$={E$_s$, E$_{sp}$, S$_s$, T$_s$, P$_s$}, where it is assumed that charging power of a power storage machine is E$_s$, discharging power E$_{sp}$ is current device power, and charging is performed only when the power supply station outside factory supplies power, S$_s$ represents a state of the power storage machine, S$_s$=0 represents that the power storage machine is in a discharging state, S$_s$=1 represents that the power storage machine is in a charging state, T$_s$ represents time the power storage machine is in the charging/discharging state, and P$_s$ represents power price when the power storage machine is charged;

d) the power price model is M$_p${P, E$_p$}, where P represents price of power supplied to the factory, and E$_p$ represents power supply amount per unit time of the power station outside factory;

e) after computing all results, the edge node generates a power consumption scheme Scheme$_i$, Scheme$_i$={Task_number=i, i∈N*; T$_{-exe}$; Period; T$_{-exe}$, Period∈R+}, where Task_number represents task number, T$_{-exe}$ represents task execution time, and Period represents task execution duration;

f) after computing all results, the edge node generates a power supply scheme Scheme$_p$, Schemep={x$_g$, T$_g$, S$_s$, T$_s$, P, S$_p$, T$_p$_01, T$_p$_10}, where x$_g$ represents number of generators that need to run in the power station in factory;

T$_g$ represents power generation time of each generator;

S$_s$ represents a state of the power storage machine, S$_s$=0 represents that the power storage machine is in a discharging state, S$_s$=1 represents that the power storage machine is in a charging state;

T$_s$ represents time the power storage machine is in the charging/discharging state;

P represents current power price;

S$_p$ represents a power supply state of the power station outside factory, S$_p$=00 represents that the power station is in a sleep state, S$_p$=01 represents that the power station only supplies power to the production device, S$_p$=10 represents that the power station only supplies power to the power storage station, and S$_p$=11 represents that the power station supplies power to both the device layer and the power storage station;

T$_p$_S$_p$ represents power supply time in the S$_p$ state, T$_p$_01 represents time to supply power to the production device only, and T$_p$_10 represents time to supply power to the power storage station only;

g) computing according to following formulae:

$$E_d = E_{sp}*T_s + T_{p\_}01*E_p + E_g*T_g$$

$$C = T_{p\_}10*P_s + T_{p\_}01*P + x_g*P_g*T_g$$

in the case where an electricity demand $E_d$ of a power consumption side is satisfied, if it is computed that the above two formulae are satisfied, a parameter combination with small C is selected as a final scheme;

h) generating schemes: after the above computation, a power consumption scheme $Scheme_i$ and a power supply scheme $Scheme_p$ are generated.

* * * * *